Sept. 26, 1961 D. R. TAIT 3,002,051

SINGLE TUBE COLOUR TELEVISION CAMERAS

Filed Feb. 21, 1957 3 Sheets-Sheet 1

*Inventor*
*D. R. Tait*
*By Glascock Downing & Seebold*
*Attys.*

Sept. 26, 1961 D. R. TAIT 3,002,051

SINGLE TUBE COLOUR TELEVISION CAMERAS

Filed Feb. 21, 1957 3 Sheets-Sheet 2

Inventor
D. R. Tait
By Glascock Downing & Seebold
Attys

Sept. 26, 1961 D. R. TAIT 3,002,051

SINGLE TUBE COLOUR TELEVISION CAMERAS

Filed Feb. 21, 1957 3 Sheets-Sheet 3

Inventor
D. R. Tait
By Glascock Downing & Seebold
Attys.

United States Patent Office 3,002,051
Patented Sept. 26, 1961

3,002,051

SINGLE TUBE COLOUR TELEVISION CAMERAS

David Russell Tait, Ottawa, Ontario, Canada, assignor to Electric & Musical Industries Limited, Hayes, Middlesex, England, a company of Great Britain Filed Feb. 21, 1957, Ser. No. 641,565
Claims priority, application Great Britain Feb. 24, 1956
6 Claims. (Cl. 178—5.4)

Figure 1:
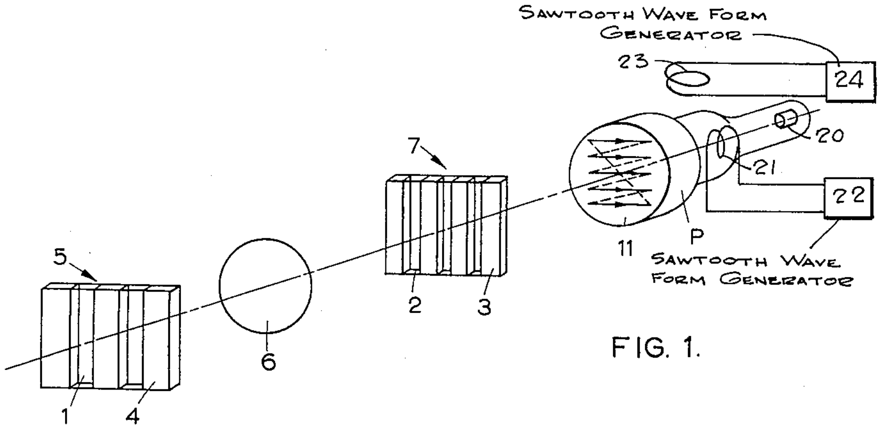

This invention relates to colour television cameras.

It is usual for colour television cameras for generating simultaneous colour television signals to comprise more than one pick-up tube, which cameras suffer from well known disadvantages due to the problems of registration of the different colour components and matching of the pick-up tube characteristics.

It has been proposed to derive simultaneous colour television signals from a camera comprising only one tube employed to generate sequential colour television signals and thereafter to convert these sequential signals to simultaneous signals by the use of conversion apparatus. However, such conversion apparatus is frequently prone to the same disadvantages as multi-tube simultaneous colour television cameras or, if not, similar disadvantages.

The object of the present invention is to provide a colour television camera comprising only one pick-up tube for deriving simultaneous colour television signals.

According to the present invention there is provided an arrangement for generating simultaneous signals representing different colour components of a light image, comprising an image pick-up tube including means for converting a light image to a charge image and means for scanning said charge image in lines of predetermined direction to produce image signals, optical means for projecting a light image to said pick-up tube, and two gratings positioned in the path of projection of said optical means, said gratings extending over the whole cross sectional area of said path at their respective positions, one grating being such that when illuminated by a light scene of at least two predetermined colours light of both said colours is transmitted in parallel strips separated by strips in which light of which at least one colour is substantially absent, the other grating being such that when illuminated by light of said two colours, light of both colours is transmitted in parallel strips separated by strips in which said one colour is substantially absent and said other colour is present, and said gratings being positioned in collimating relationship, so that when a light image including components of said two predetermined colours is projected on the pick-up tube, the component of said one colour is divided into strips transverse to said predetermined direction and the component of the other colour is not so divided, whereby operation of the tube produces simultaneous signals representing said two components, which signals can be separated on a frequency basis.

The expression "collimating relationship" used herein and in the claims means a relationship such that for light of said one colour, say red, incident at a series of discrete angles in a plane perpendicular to the gratings, obturation is produced by the interaction of the gratings. The angles of incidence for which such obturation is possible are dependent upon the relative optical spacing of the gratings from the target surface and the separation of the strips along which the gratings are non-transmissive for the particular colour. Light of said one colour incident at angles intermediate said discrete angles can pass, in varying degrees, through both gratings to form spaced strips on the surface of the pick-up tube which forms the target for the projected light image. The amount of light of said one colour which is passed through both gratings will vary in a continuous manner from substantially zero to substantially 100% and to substantially zero again for intermediate angles of incidence between any two successive ones of said discrete angles so that scanning of the corresponding charge image then produces image signals in the form of modulation components of a carrier wave, the frequency of which depends on the spacing of the strips on the target and the scanning speed.

For the second predetermined colour, say green, one at least of the gratings is transmissive overall so that it does not function as a grating for that particular colour. Consequently the respective colour component of an image focused on the target, is not divided into strips and the corresponding image signals are produced as video signals.

If it is desired to generate simultaneous signals, from a single pick-up tube representing three colour components of an image, this can be achieved in accordance with the invention by employing three gratings in the path of projection of the optical means. Although the three colour components employed will usually be red, green and blue, the invention is applicable to any three primary colours and to facilitate the description of this form of the invention the three colours will be denoted by A, B and C in this paragraph and the corresponding claims. The first grating in the path is such that when illuminated by light of the three colours A, B and C, light of all three colours is transmitted in parallel strips separated by strips in which light of at least colours B and C are absent. The second grating is such that when illuminated by light of said three colours, light of all three colours is transmitted in parallel strips separated by strips in which light of colour B is absent and light of colours A and C is present. The third grating is such that when illuminated by light of said three colours light of all three colours is transmitted in parallel strips separated by strips in which light of colour C is absent and light of colours A and B is present. Moreover, the second and third gratings are respectively in collimating relationship with the first grating but are spaced by different distances from the target surface of the pick-up tube, such that although the B and C colour components are divided into strips, the spacing and width of the strips of colour C are substantially different from those of the colour B, the difference being such that the modulation components of the corresponding carrier waves can be separated on a frequency basis.

Figure 2:
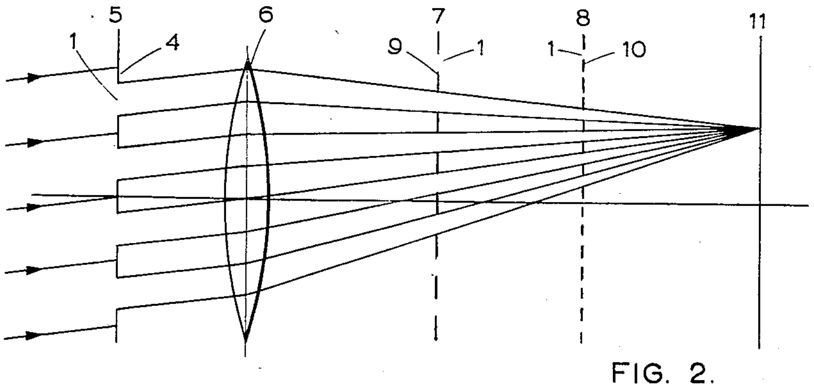
Figure 3:
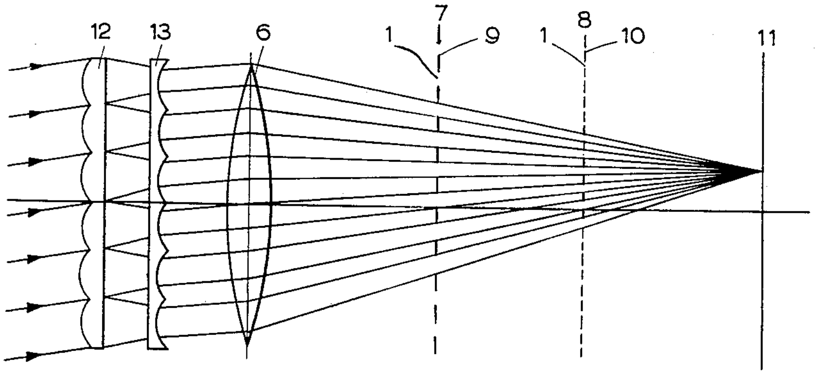
Figure 1A:
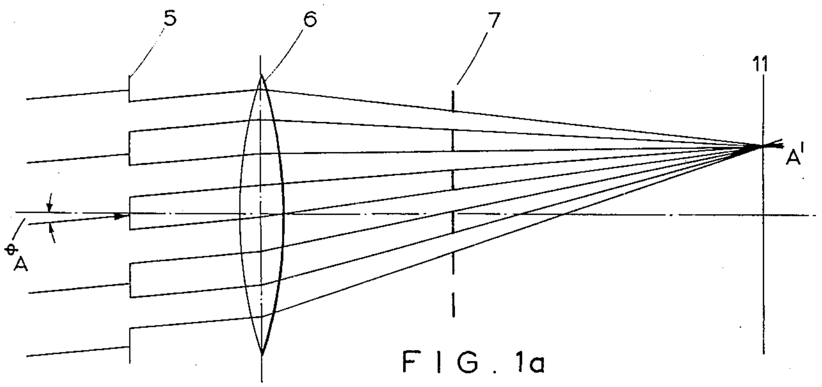
Figure 1B:
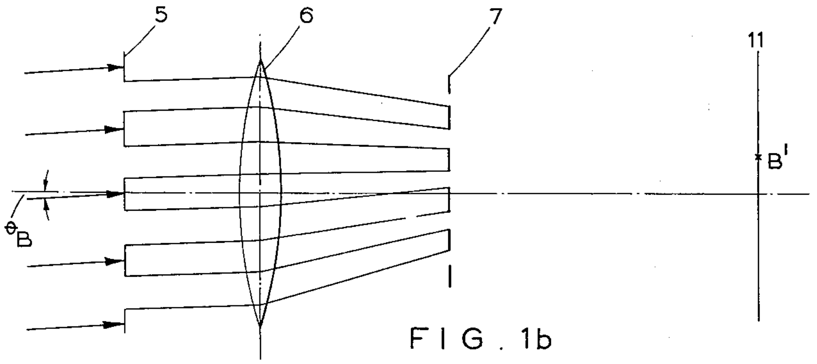
Figure 1C:
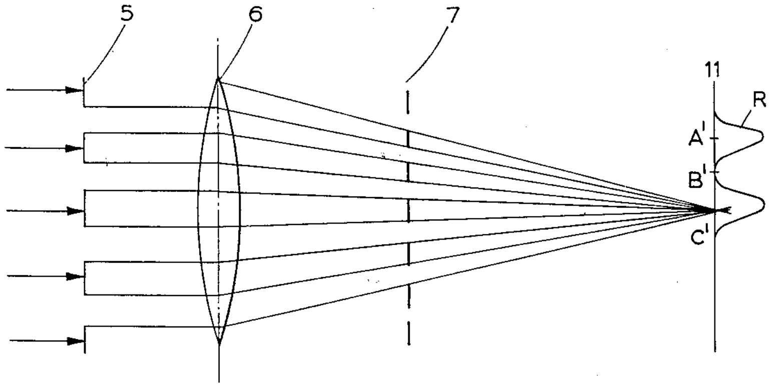
Figure 4:
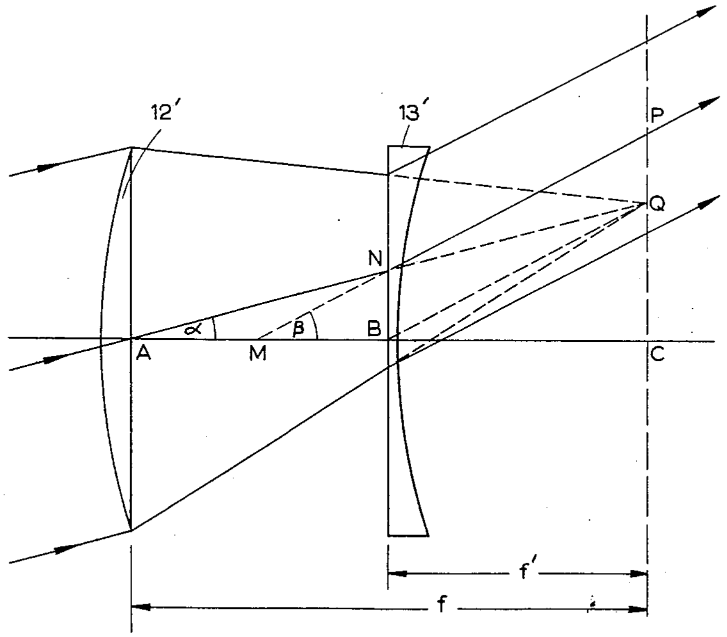
Figure 5:
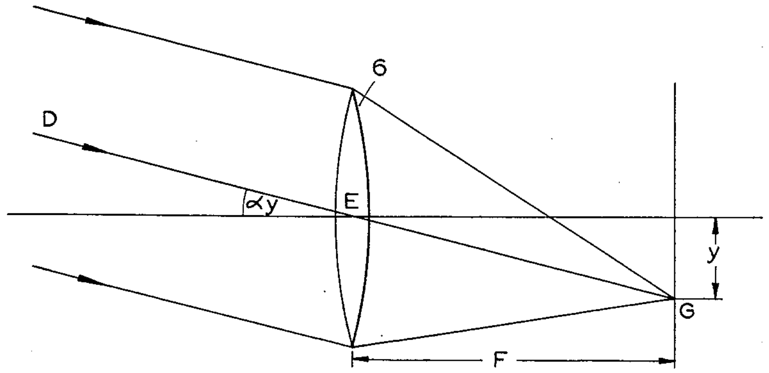

In order that the present invention may be clearly understood and readily carried into effect, the same will now be more fully described with reference to the accompanying drawings, in which:

FIGURE 1 shows diagrammatically the general disposition of an arrangement according to the present invention, for producing simultaneous signals representing two colour components, FIGURES 1*a*, 1*b* and 1*c* are diagrams which will be used to explain the operation of FIGURE 1, FIGURE 2 illustrates one example of an arrangement according to the present invention, for producing simultaneous signals representing three colour components, FIGURE 3 illustrates an example of a preferred arrangement according to the present invention, and FIGURES 4 and 5 are explanatory of part of the description of the example of FIGURE 3.

In FIGURE 1 the image pick-up tube P of the colour television camera has optical means represented by a lens 6 for focussing a light image on a target surface in a pick-up tube. The pick-up tube will be assumed to be of the construction described in the Journal of the Institute of Electrical Engineers, vol. 97, part 3, No. 50, page 383 et sequi. In that case, the target surface on which the image is projected comprises a mosaic screen, this surface being identified in the drawing by the reference 11. The pick-up tube also includes an electron gun 20 for producing an electron beam and has scanning means for deflecting the electron beam to cause it to scan the mosaic screen 11 in lines which (as seen in the drawing) are horizontal, a few such lines being indicated. The scanning means is represented diagrammatically in the drawing as a line scanning coil 21 fed by a sawtooth waveform generator 22 and a field scanning coil 23 fed by a sawtooth waveform generator 24. Two gratings in the form of strip filters are located in the path of projection to the target 11, the first of these gratings 5 having alternate fully transmitting strips 1 and non-transmitting (or green transmitting) strips 4. This grating precedes the lens 6 and it may be assumed that light emanating from a point source of the scene being televised is parallel when incident on the grating 5, its angle of incidence in horizontal and vertical planes being dependent upon the position of the point in the scene. The second grating, denoted by the reference 7, follows the lens 6 in the light projection path and consists of strips 2 which are red and green transmitting separated by strips 3 which are only green transmitting. The gratings 5 and 7 are positioned in collimating relationship, this relationship being achieved when the spacing of the strips 1 and 2 on the gratings 5 and 7, respectively, are proportional to the distances of the target 11 from the lens 6 and the grating 7. When the gratings are in collimating relationship, red light incident from the scene at a series of discrete angles in a horizontal plane is substantially attenuated or obturated by the strips 4 and 3 on the gratings 5 and 7, respectively. However, red light incident at intermediate angles is passed in varying degrees by the strips 1 and 2 as described above. Consequently the red component of the scene causes a lined charge image to be formed on the target 11, the direction of the lines being parallel to the gratings and thus vertical. On the other hand, the grating 7 is wholly transmitting for green light and is therefore ineffective as a grating for light of this colour and as this grating is not in the focal plane of the lens 6, the green colour component forms a charge image on the target 11 without any line structure at all except those which may be inherent from the scene itself.

The action of the gratings 5 and 7 in producing a lined charge image in response to the red component from the scene is illustrated in greater detail in FIGURES 1*a*, 1*b* and 1*c*.

In these figures some rays from red light are indicated and it is to be understood that the gratings 5 and 7 are normal to the plane of the paper and that the strips thereof are vertical.

The image plane of the lens system is denoted by 11. This plane will normally be co-incident with the surface of the mosaic screen in the pick-up tube. Assume that A′, B′ and C′ are vertical lines on the image plane and are images of vertical lines A, B and C on the scene being televised. Moreover as previously indicated it is assumed that light from a point source of the scene is parallel when incident on the grating 5 and the lens 6, an assumption which is justified in practice having regard to the focal length of lenses normally employed in television cameras.

As indicated in FIGURE 1*a* light from all points on the line A of the image is incident on the grating at an angle $\theta_A$ (in a horizontal plane), to the axis of the optical system. In addition, as indicated in FIGURE 1*b* light from all points on the image line B are incident on the grating 5 at an angle $\theta_B$ onto the axis of the optical system and as indicated in FIGURE 1*c*, light from all points on the line C are incident on the grating 5 in lines parallel to the axis ($\theta_C=0$). Considering the image line A it is obvious from FIGURE 1*a* that the red light incident at the angle $\theta_A$ will be chopped by the grating 5 into parallel bands even though the grating 5 is not in focus. Furthermore on the assumption that A′ is the image of A, all light incident at the angle $\theta_A$ on the grating converges on the line A′ after passing through the lens 6. It is therefore feasible to position another grating, namely the grating 7, in such position that all the red light transmitted through the grating 5 is also transmitted through grating 7, neglecting diffraction effects. For a grating of the pitch indicated in FIGURE 1*a*, the required position is as indicated. However when the grating 7 is positioned in this way FIGURE 1*b* shows that for the angle $\theta_B$ the red bands of light transmitted through the grating 5 are stopped by those strips of the grating 7 which are opaque to red light. Consequently substantially no red light from B falls on the line B′ of the image plane 11, although green light may fall on this line because either one or both of the gratings 5 and 7 are uniformly transmitting for green light. FIGURE 1*c* shows that $\theta_C$ is another angle of incidence for which all light transmitted through the red transmitting bands of the grating 5 is also transmitted through the red transmitting bands of the grating 7. The red component of C therefore goes to form the image C′ on the image plane 11.

FIGURES 1*a*, 1*b* and 1*c* depict extreme cases in which either substantially all red light is transmitted or substantially no red light is transmitted and obviously there are intermediate values of $\theta$ in which there is partial transmission of red light to the plane 11. Furthermore the pitch of the gratings is very much smaller than the pitch illustrated so that many closely spaced maxima and minima occur in the image plane 11. Therefore in response to uniform red illumination, the charge image formed on the mosaic screen of the pick-up tube positioned in the image plane 11 will have a chage variation somewhat as depicted by the line R, but in a much smaller scale.

If the strips 4 of the grating 5 are green transmitting no green light is obturated at this grating and since this is the case at the grating 7 the transmission of the incident green component is 100% efficient.

When the target 11 in the pick-up tube P is scanned by the electron beam, image signals are produced, those corresponding to the green component of the scene being produced as video signals in normal manner. Those corresponding to the red component of the scene, however, are in the form of a series of pulses the peaks of which correspond to the crossing by the scanning beam of the lines in which there is a 100% representation of the red component, such pulses being modulated in amplitude corresponding to the intensity of the respective elements of the scene. The output signals corresponding to the red component can therefore be regarded as a carrier wave modulated in amplitude by signals representing the red component and the collimating relationship being so arranged that the carrier frequency is sufficiently above the video frequency range of the green signals that the side-bands of the carrier wave produced by the amplitude modulation lie outside the frequency spectrum of the green video signals. Consequently the signals corresponding to the red and green components of the scene can be separated on a frequency basis and the carrier wave bearing the red component signals can subsequently be demodulated to derive the red signals as video signals.

The arrangement of FIGURE 2 illustrates the application of the present invention to a three colour single pick-up tube camera and is similar to that of FIGURE 1, common reference numerals being used where possible. The grating 7 is now comprised of alternate fully transmitting strips 1 and cyan (blue and green) transmitting strips 9 and this grating is succeeded by a further grating 8 in the form of a strip filter having alternate fully transmitting strips 1 and yellow (red and green) transmitting strips 10. Thus, the red component sets up a lined charge distribution on the target 11 as before since the strips 1 and 10 transmit red light but the strips 9 do not. In a similar manner the blue component of the light transmitted by the grating 5 sets up a lined charge distribution since the strips 1 and 9 transmit blue light but the strips 10 do not. The gratings 7 and 8 are separated from each other and arranged in collimating relationship with respect to the grating 5 so that $$\frac{\text{Spacing between grating strips}}{\text{Distance from grating to target}}=\text{constant}$$

as described above, the denominator being the focal length of lens 6 in the case of the grating 5.

It will be clear that as the grating 8 is nearer the target 11 and the spacing of its strips is proportionately narrower than is the case for the grating 7 then the discrete angles of incidence at the lens 6 for which no blue light is transmitted to the target 11 are more closely spaced and consequently more numerous. Thus the frequency of the blue "carrier wave" in the derived colour television signals is higher than that associated with red component and may be so arranged that the blue carrier wave side-bands are outside the frequency spectrum of the green and red component variations.

The green light transmitted by the grating 5 however is unaffected by either of the gratings 7 and 8 and sets up a conventional charge distribution on the target 11 so that on scanning the target there are derived signals comprising a video signal representative of the green component variations and two carrier waves of different predetermined frequencies and modulated by the red and blue component variations, respectively. These derived signals may be readily separated on a frequency basis by the use of a circuit comprising suitable band pass filters and signals representative of the red and blue component variations may be derived by detection, to derive simultaneous coulour television signals.

Since the light efficiency of the grating 5 is 50% and that of the red and blue components is reduced again by 50% at gratings 7 and 8, respectively, the resultant overall light efficiency of the arrangement of FIGURE 2 is $(\frac{1}{4}+\frac{1}{4}+\frac{1}{2})\div 3=\frac{1}{3}$. If the strips 4 of the grating 5 are green transmitting, then clearly the overall light efficiency may be increased to 50%. These efficiencies arise from the fact that the gratings extend from the whole cross sectional area of the light path of the optical projection means, so that no green light is attenuated at the gratings 7 and 8 whilst the attenuation of green light at the grating 5 is at most 50%. Moreover the attenuation of red and blue light is only 50% at the grating 5 and at the grating 7 or 8 as the case may be.

FIGURE 3 illustrates a preferred form of the invention, in which the grating 5 of FIGURE 2 is replaced by two lenticular plates 12 and 13 being made up of convex elements and concave elements, respectively. Clearly, the light efficiency of such a grating is 100 percent for each colour component (that is, ideally) and the overall light efficiency is increased to $\frac{2}{3}$. The other references of FIGURE 3 are as in FIGURE 2. In practice the plates 12 and 13 may be achromatic.

FIGURE 4 shows a plane section (perpendicular to the element axis) through a single element of the lenticular pair 12 and 13 of FIGURE 3. A beam of parallel light, at an angle $\alpha$ to the element axis is incident on the convex element 12′ which focuses the beam at Q on the focal plane of the element 12′. However, the lenticular pair are arranged to have coincident focal planes, thus Q is also on the focal plane of the concave element 13′ so that the transmitted light will also form a parallel beam at an angle $\beta$ to the element axis. A ray passing through the centre B of the element 13′ is not deflected and so the direction of the transmitted beam is that of BQ. The transmitted beam centre appears to come from M, obtained by producing PN to intersect the axis, where N is the intersection with the element 13′ of the ray from the centre A of the element 12′ and P is the intersection with the common focal plane of a line from N parallel to BQ.

Since MN is parallel to BQ and NB and QC are perpendicular to the element axis MBC then $$\frac{MB}{BC}=\frac{NB}{QC}$$

But ANQ is a straight line, so $$\frac{NB}{QC}=\frac{AB}{AC}=\frac{f-f'}{f}=\frac{a-1}{a}$$

where $f$ and $f'$ are the focal lengths of elements 12 and 13, respectively, and "$a$" is their ratio, $f/f'$.

Thus $$\frac{MB}{BC}=\frac{a-1}{a}=\text{constant}$$

that is to say M is fixed, independent of the incident angle $\alpha$.

In FIGURE 3 then, the action of the lens 6 is unaffected by the action of the lenticular pair 12 and 13 since the beam incident on lens 6 will be parallel and appear to come from an image plane through a fixed point. However, due to a change in incidence angle from $\alpha$ to $\beta$, the image's dimension in the plane of FIGURE 3 is changed.

FIGURE 5 illustrates the action of convex lens 6 of FIGURE 3 on a parallel incident beam such as produced by the lenticular pair described above. The direction of the beam is DE and it is focussed at G. Then the co-ordinate of the image point G for parallel light depends only on the angle $\alpha y$ of the ray through the centre of the lens.

Now $y=F\tan\alpha y$ where F is the focal length of lens 6.

If $y$ changes to $y'$ due to $\alpha y$ become $\beta_y$.

In FIGURE 4

$$\tan\beta=\frac{QC}{BC},\ QC=f\tan\alpha,\ BC=f'=\frac{f}{a}$$

$$\beta=\tan^{-1}\frac{af'\tan\alpha}{f'}=\tan^{-1}(a\tan\alpha)$$

Hence $y'=F\tan\beta_y=Fa\tan\alpha_y=ay$.

Thus, in FIGURE 3, the magnification of the lens 6 is changed due to the introduction of the lenticular pair 12 and 13, but only in one direction. This may be used where a change in aspect ratio is required, such as in so-called "cinemascope" or colour films. If, however, it is desired to alter the magnification in two directions, for instance to retain the correct aspect ratio, two crossed lenticular pairs may be used. If this is so, then the two colour gratings may also be crossed to reduce interaction between the colour signals to a minimum. In the latter case scanning would be at an angle of 45° to each colour signal grating on the mosaic of the pick-up tube and two gratings 5 as shown in FIGURE 2 would be required to operate one with each grating 7 and 8 as described, for example, for the gratings 5 and 7 of FIGURE 1.

Also a lenticular pair which changes an aspect ratio in one direction only may be incorporated in colour television cameras for obtaining line sequential signals by scanning laterally compressed colour component images side by side so as to form a correct aspect ratio on the target of a single pick-up tube, thus eliminating the need for a complex "anamorphic" lens or a cylindrical mirror system.

The pick-up tube P of FIGURE 1 and as represented by the target 11 in FIGURES 2 and 3 may be of any suitable construction other than that described and may, for example, comprise a continuous video cathode which converts the light image to the electron image which is projected on to another target to produce a charge image which latter target is scanned by an electron beam. Also a pick-up tube of the image dissector type may be equally well employed.

In the application of the present invention to a two colour single pick-up tube camera as described by way of example with respect to FIGURE 1 the roles of gratings 5 (or a lenticular grating as 12, 13 of FIGURE 3) and 7 may be interchanged.

In the derivation of simultaneous colour television signals for a red-green-blue system in accordance with the present invention suitable frequency ranges for the derived signals are 0 to 2.5 mc./s. for the green video signal, 3.0 to 5.0 mc./s. centred on a carrier wave frequency of 4.0 mc./s. for the red component signal and 5.5 to 6.5 mc./s. centred on a carrier wave frequency of 6.0 mc./s. for the blue component.

What I claim is:

1. An arrangement for generating simultaneous signals representing different colour components of a light image, comprising an image pick-up tube including means for converting a light image to a charge image and means for scanning said charge image in lines of predetermined direction to produce image signals, optical means for projecting a light image to said pick-up tube, and two gratings positioned in the path of projection of said optical means, said gratings extending over the whole cross sectional area of said path at their respective positions, one grating being such that when illuminated by a light scene of at least two predetermined colours, light of both said colours is transmitted in parallel strips separated by strips in which light of at least one colour is substantially absent, the other grating being such that when illuminated by light of said two colours, light of both colours is transmitted in parallel strips separated by strips in which said one colour is substantially absent and said other colour is present, and said gratings being positioned in collimating relationship so that when a light image including components of said two predetermined colours is projected on the pick-up tube the component of said one colour is substantially divided into strips transverse to said predeterimned direction and the component of the other colour is not so divided, whereby operation of the pick-up tube produces simultaneous signals representing said two components, which signals can be separated on a frequency basis.

2. An arrangement according to claim 1 comprising a lenticulated lens cap arranged to form said first-mentioned grating.

3. An arrangement according to claim 1 wherein the strips of said gratings are all parallel and the direction of scanning of said pick-up tube is substantially perpendicular to the direction of said strips.

4. An arrangement for generating simultaneous signals representing three different predetermined primary colour components of a light image, comprising an image pick-up tube including means for converting a light image to a charge image and means for scanning said charge image in lines of predetermined direction to produce image signals, optical means for projecting a light image to said pick-up tube, and three gratings in the path of projection of said optical means, one grating being such that when illuminated by a light scene comprising light of each of three predetermined primary colours A, B and C light of said colours A, B and C is transmitted in parallel strips separated by strips in which light of at least said colours B and C is substantially absent, a second one of said grating being such that when illuminated by light of said colours A, B and C light of said colours A, B and C is transmitted in parallel strips separated by strips in which said colour B is substantially absent and said colours A and C are present, the third one of said grating being such that when illuminated by light of said colours A, B and C light of said colours A, B and C is transmitted in parallel strips separated by strips in which said colour C is substantially absent and said colours A and B are present, and said second and third gratings being positioned in collimating relationship with respect to said first grating so that when a light image including components of each of said colours A, B and C is projected on the pick-up tube the components of said colours B and C are substantially divided into strips transverse to said predetermined direction, said strips having different separation for each of said colours B and C, respectively, the component of said colour A not being so divided, whereby operation of the pick-up tube produces simultaneous signals representing said three components, which signals can be separated on a frequency basis.

5. An arrangement according to claim 4 wherein said primary colours A, B and C are green, red and blue, respectively, the width and separation of the blue component strips projected on to said pick-up tube being narrower than the corresponding dimensions of the red component strips projected on to the pick-up tube.

6. An arrangement for generating signals representing colour components of a light image comprising an image pick-up tube including a target surface, optical means for projecting a light image to said surface, and two gratings positioned in the path of projection of said optical means, both gratings extending over the whole cross sectional area of said path at their respective positions, one grating being such that when illuminated by light having components of at least two predetermined colours, light of both said colours is transmitted without substantial attenuation in parallel strips separated by strips in which light of at least one of said colours is substantially attenuated, the other grating being such that when illuminated by light of said two colours, light of both colours is transmitted without substantial attenuation in parallel strips separated by strips in which light of said one colour is substantially attenuated and of the other colour is substantially un-attenuated, and said gratings being positioned in collimating relationship so that when a light image including components of said two colours is projected on said surface, the component of said one colour is substantially divided into strips and the component of the other colour is not so divided.

References Cited in the file of this patent

UNITED STATES PATENTS

| | | |
|---|---|---|
| 2,479,820 | Devore | Aug. 23, 1949 |
| 2,705,741 | Griffin | Apr. 5, 1955 |
| 2,733,291 | Kell | Jan. 31, 1956 |
| 2,892,883 | Jesty et al. | June 30, 1959 |
| 2,907,817 | Teer | Oct. 6, 1959 |